Sept. 8, 1953  J. I. ATKINS  2,651,703
CABINET
Filed May 2, 1952
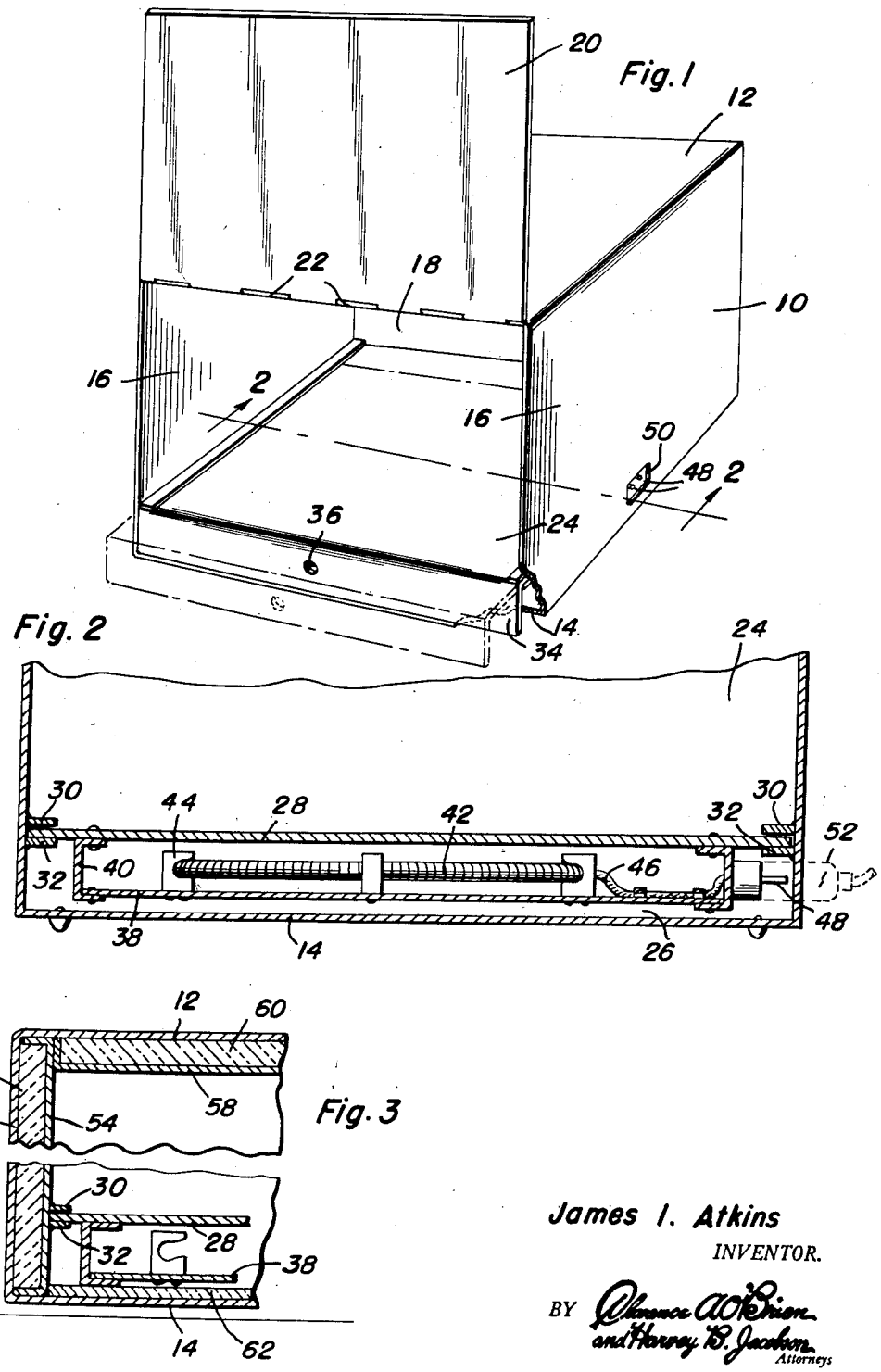
James I. Atkins
INVENTOR.

Patented Sept. 8, 1953

2,651,703

UNITED STATES PATENT OFFICE 2,651,703

CABINET

James I. Atkins, Hollywood, Fla.

Application May 2, 1952, Serial No. 285,659

3 Claims. (Cl. 219—19)

This invention comprises novel and useful improvements in a cabinet and more specifically pertains to a receptacle for preventing the absorption of moisture, as in humid climates and atmosphere by such normally dry and crisp foods as crisp crackers, dry crisp-type cookies, cereals and the like; and the absorption of moisture by salt.

The primary object of this invention is to provide a food cabinet maintaining a dry atmosphere in which may be stored foods and protecting the same during storage from absorbing moisture from humid atmospheres and climates to retain the foods stored therein in a dry crisp condition.

A further object of this invention is to provide a cabinet in conformity with the preceding objects which shall be of a simple construction, shall contain a heating means in a concealed and convenient location therein, and wherein the heating means will not be in contact with or will not intrude into the food storage chamber of the device; and will be merely sufficient to maintain dry air within the cabinet.

A further important object of this invention is to provide a wood cabinet as set forth in the foregoing objects which shall include a bottom wall or partition slidably mounted in the cabinet for easy movement into and out of the cabinet; and which partition shall support and carry therebeneath in an efficient heat exchange relationship therewith, an electrical heating element.

These, together with various ancillary features and objects of the invention, which will later become apparent as the following description proceeds, are attained by the present invention, a preferred embodiment which has been illustrated, by way of example only, in the accompanying drawings, wherein:

Figure 1 is a perspective view showing a food cabinet incorporating therein the principles of this invention, the same being shown in perspective view with the front door of the cabinet in its open position, and showing in dotted lines a slightly extended position of the slidable bottom wall partition of the food chamber of the cabinet, parts being broken away to show the sliding support for the partition;

Figure 2 is a fragmentary vertical transverse sectional detail view, taken substantially upon the plane indicated by the section line 2—2 of Figure 1; and Figure 3 is a fragmentary vertical sectional detail view showing the manner in which the walls, top and bottom of the cabinet may be provided with heat insulating material therein.

Referring now more specifically to the accompanying drawings, wherein like numerals designate similar parts throughout the various views, it will be seen that numeral 10 designates generally a cabinet or receptacle of any desired material, type and character, the same including a top wall 12, a bottom wall 14, a pair of side walls 16, a back wall 18 and a front wall or door 20 which is hinged to the top 12 as by hinges 22.

As shown in Figure 2, the interior of the cabinet is divided into two compartments, an upper compartment forming a food storage chamber 24, and a lower compartment forming a heating chamber 26, by means of a partition 28 which extends between the two side walls and is slidably supported therein.

The sliding supports for the partition 28 consist of a pair of channel constructions, which are supported by the two side walls 16 and extend entire length of the same from the front to the back of the cabinet. In some instances, these supports may be formed as channel members which are removably secured or may be permanently attached to the side walls; while in other instances the channel supports may comprise upper and lower parallel, vertically spaced flanges 30 and 32, see Figure 2, which slidably receive therebetween and support the partition member 28.

The latter, at its front end is preferably provided with a down turned flange or lip 34 which serves as a closure against the front surface of the bottom wall 14 and for the heating chamber 26 when the partition is in its recessed position within the cabinet. An opening 36 may be provided in this flange to provide a finger grip whereby the partition may be slid inwardly or outwardly of the cabinet as desired.

A supporting platform 38 is disposed in parallel relation to the partition 28 but below the same, and secured to that partition by supporting members or fasteners 40. The members 40, as shown in Figure 2, are channel-shaped in cross section, and may comprise channel members extending longitudinally of the partition and cabinet; or may simply comprise enclosing walls which support and enclose the platform 38. In any event, the construction is such that the platform depends from and is supported by the partition 28 and is thus movable into and out of the cabinet with the partition. Disposed between the platform and partition and supported by the platform is an electrical heater 42 of any desired character. For convenience of illustration, this heater has been shown as consisting of an electrical resistance wire, mounted upon suitable di-electric supporting brackets 44 which are carried by the platform 38. It is evident, however, in place of the electrical resistance wire, the electric light bulbs or other suitable electric heaters could be provided. It is merely necessary for the purpose of this invention that the electrical heating means shall be mounted below the partition and supported thereby for movement in and out of the cabinet therewith. Suitable electrical connections are provided, of any desired character for energizing the electrical heating means. Conveniently, these may consist of electric cables 46, terminating in detachable electrical contact members 48, and which are disposed adjacent an access opening 50 in a side wall 16 of the cabinet below the partition.

Any conventional form of current supplying cable may be utilized to form an electric connection with a contact 48 in a manner well understood by those skilled in the art, such electric cable and connection being indicated by dotted lines at 52 in Figure 2.

While in some instances, it may be preferred to form the cabinet of sheet metal or other suitable material, and to construct the same without the use of insulation in the interest of economy of construction, it is also obvious, that the invention may utilize the benefits of insulation for retaining heat and preventing the cabinet in use from heating the surrounding environment. For this purpose, as shown in Figure 3, these cabinet side walls 16 may receive inner side walls 54 with a layer or layers of insulating material 56 of any desired character and composition interposed therebetween. In a similar manner, the back wall 18 and the cover member 20 may be provided with insulating material. Also, the top wall 12 may have an inner top wall 58 with a layer of insulation 60 therebetween, while the bottom wall 14 may have a mat, sheet or coating of insulating material 62 disposed thereupon. The construction of the partition 48, the platform 38, and the slide supports 30 and 32 are identical with that previously described.

In use, it is preferred to provide such a heating element that a temperature may be maintained within the cabinet of about eighty to one-hundred degrees. In any event, it must be sufficient to maintain crackers, cereals, or other dry or crisp foods in a crisp condition and will prevent their absorption of moisture from the surrounding atmosphere, particularly when the latter is humid in nature.

The device is compact, of simple and inexpensive construction, wholly dependable in its operation and requires a very low upkeep or maintenance cost.

From the foregoing, the construction and operation of the device will be readily understood and further explanation is believed to be unnecessary.

However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A food cabinet comprising a casing including side walls, a bottom wall, a front door and a food storage chamber therein, a horizontal partition extending between said side walls spaced above said bottom wall and forming a floor for said storage chamber, an electrical heater disposed in said cabinet beneath said partition, supports on said side wall, said partition being slidably mounted on said supports, a platform secured to the underside of said partition, said heater being secured to and resting upon said platform, said cabinet having an opening in a side wall below said partition for passage of electric cables to said heater, a downturned flange on the front of said partition closing the opening between said bottom wall and said partition.

2. A food cabinet comprising a casing including side walls, a top wall, a bottom wall, a front door and a food storage chamber therein, a horizontal partition extending between said side walls in spaced relation above said bottom wall and forming a floor for said storage chamber, an electrical heater connected to the underside of said partition, supports on said side walls, said partition being slidably mounted on said supports, said cabinet having an opening in a side wall below said partition for passage of electrical cables to said heater, said partition having a downturned flange at the front thereof closing the opening between said bottom wall and said partition.

3. A food cabinet comprising a casing including side walls, a top wall, a bottom wall, a front door and a food storage chamber therein, a horizontal partition extending between said side walls in spaced relation above said bottom wall and forming a floor for said storage chamber, an electrical heater connected to the underside of said partition, supports on said side walls, said partition being slidably mounted on said supports, said cabinet having an opening in a side wall below said partition for passage of electrical cables to said heater, said partition having a downturned flange at the front thereof closing the opening between said bottom wall and said partition, said front door being hingedly secured to said top wall and in juxtaposition with said downturned flange when in closed position.

JAMES I. ATKINS.

References Cited in the file of this patent

UNITED STATES PATENTS

| Number | Name | Date |
|---|---|---|
| 1,191,196 | Kuhn et al. | July 18, 1916 |
| 1,597,187 | Garman | Aug. 24, 1926 |
| 1,686,500 | Whorff | Oct. 2, 1928 |
| 1,809,867 | Rittberger | June 16, 1931 |
| 1,817,118 | Adams | Aug. 4, 1931 |
| 2,491,529 | Spreen | Dec. 20, 1949 |
| 2,520,543 | Hawkins | Aug. 29, 1950 |
| 2,557,832 | McCormick | June 19, 1951 |
| 2,583,118 | Porambo | Jan. 22, 1952 |